United States Patent [19]
Dinnis et al.

[11] Patent Number: 5,913,922
[45] Date of Patent: Jun. 22, 1999

[54] METHOD OF TRANSMITTING MESSAGES BETWEEN SOFTWARE PROCESSES IN A MULTITASKING DATA PROCESSING SYSTEM

[75] Inventors: Richard E. Dinnis, Stratford, Conn.; Michael T. Powers, Sudbury, Mass.

[73] Assignee: Pitney Bowes Inc., Stamford, Conn.

[21] Appl. No.: 07/760,637

[22] Filed: Sep. 16, 1991

[51] Int. Cl.[6] ................................................... G06F 9/40
[52] U.S. Cl. ............................................................ 709/300
[58] Field of Search ................................... 395/650, 700, 395/680, 683, 684

[56] References Cited

U.S. PATENT DOCUMENTS

| | | | |
|---|---|---|---|
| 3,618,039 | 11/1971 | Baltzly et al. | 395/821 |
| 4,271,470 | 6/1981 | Dlugos et al. | 705/407 |
| 4,271,481 | 6/1981 | Check et al. | 705/405 |
| 4,308,579 | 12/1981 | Dlugos | 705/407 |
| 4,410,961 | 10/1983 | Dlugos et al. | 395/824 |
| 4,466,079 | 8/1984 | Daniels et al. | 705/407 |
| 4,525,785 | 7/1985 | Soderberg et al. | 705/410 |
| 4,603,400 | 7/1986 | Daniels | 395/500 |
| 4,630,196 | 12/1986 | Bednar, Jr. et al. | 395/200.32 |
| 5,133,053 | 7/1992 | Johnson et al. | 395/200.53 |
| 5,230,051 | 7/1993 | Quan | 395/680 |

OTHER PUBLICATIONS

A. Silberschatz and P.B. Galvin, *Operating System Concepts* (4th ed. Addison–Wesley Publ. Co. 1994), p. 125.
H.M. Deitel, *An Introduction to Operating Systems* (2d ed. Addison–Wesley Publ. Co. 1990), p. 123.

*Primary Examiner*—Alvin E. Oberley
*Assistant Examiner*—St. John Courtenay, III
*Attorney, Agent, or Firm*—Robert H. Whisker; David E. Pitchenik; Melvin J. Scolnick

[57] ABSTRACT

In a data processing system that includes operating system software with a messaging capability, a method of transmitting a message between software processes includes a message clearing house that (a) receives a message transmittal request from a sending process;

(b) generates a header for the message in accordance with the operating system's requirements; said header includes information indicating the time at which the request is received, and said header is stored in a circular buffer to facilitate debugging;

(c) determines an exchange address for the process that is to receive the message; and (d) transmits the message via the operating system to the exchange address of the receiving process.

12 Claims, 11 Drawing Sheets

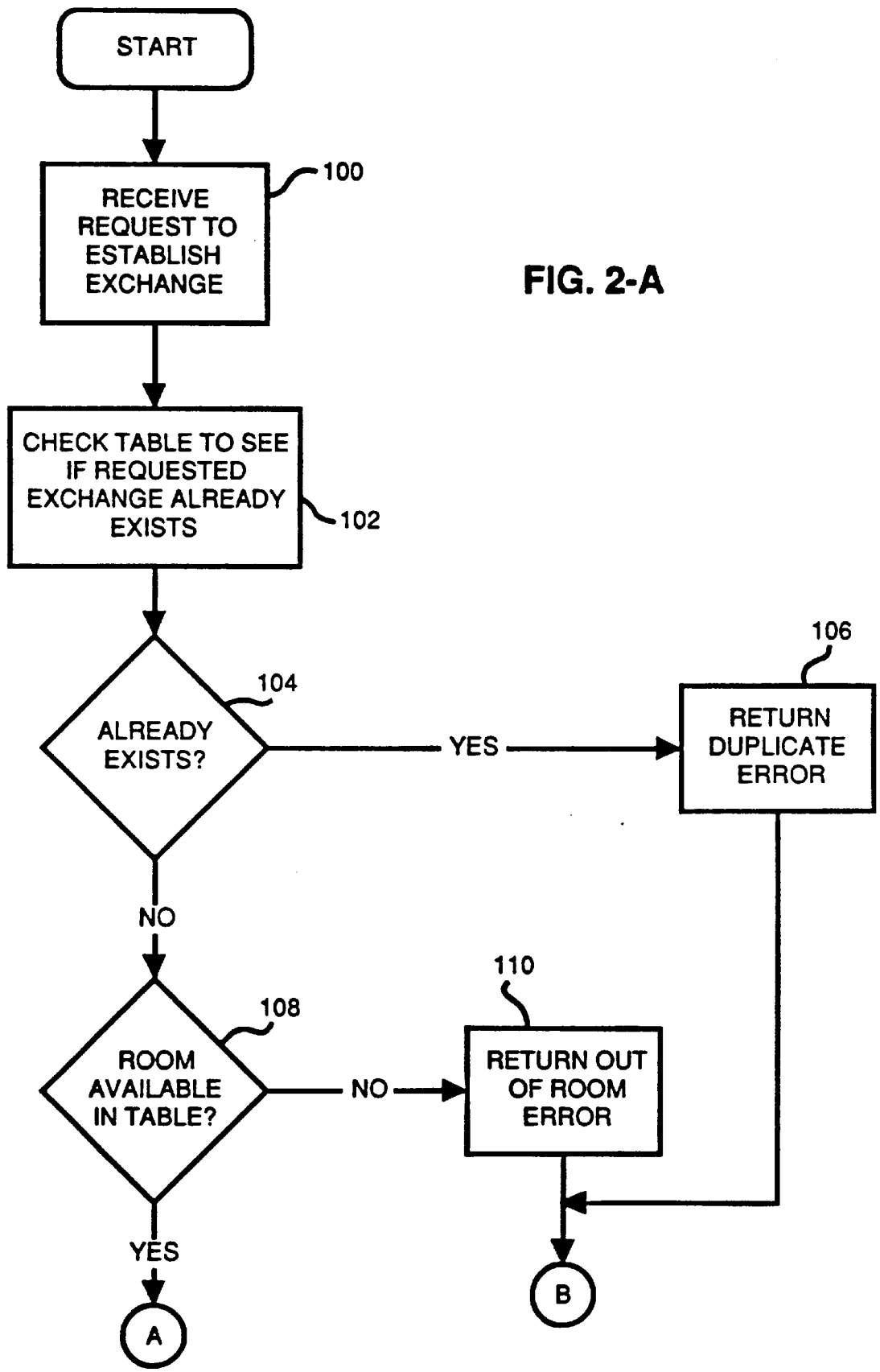
FIG. 2-A

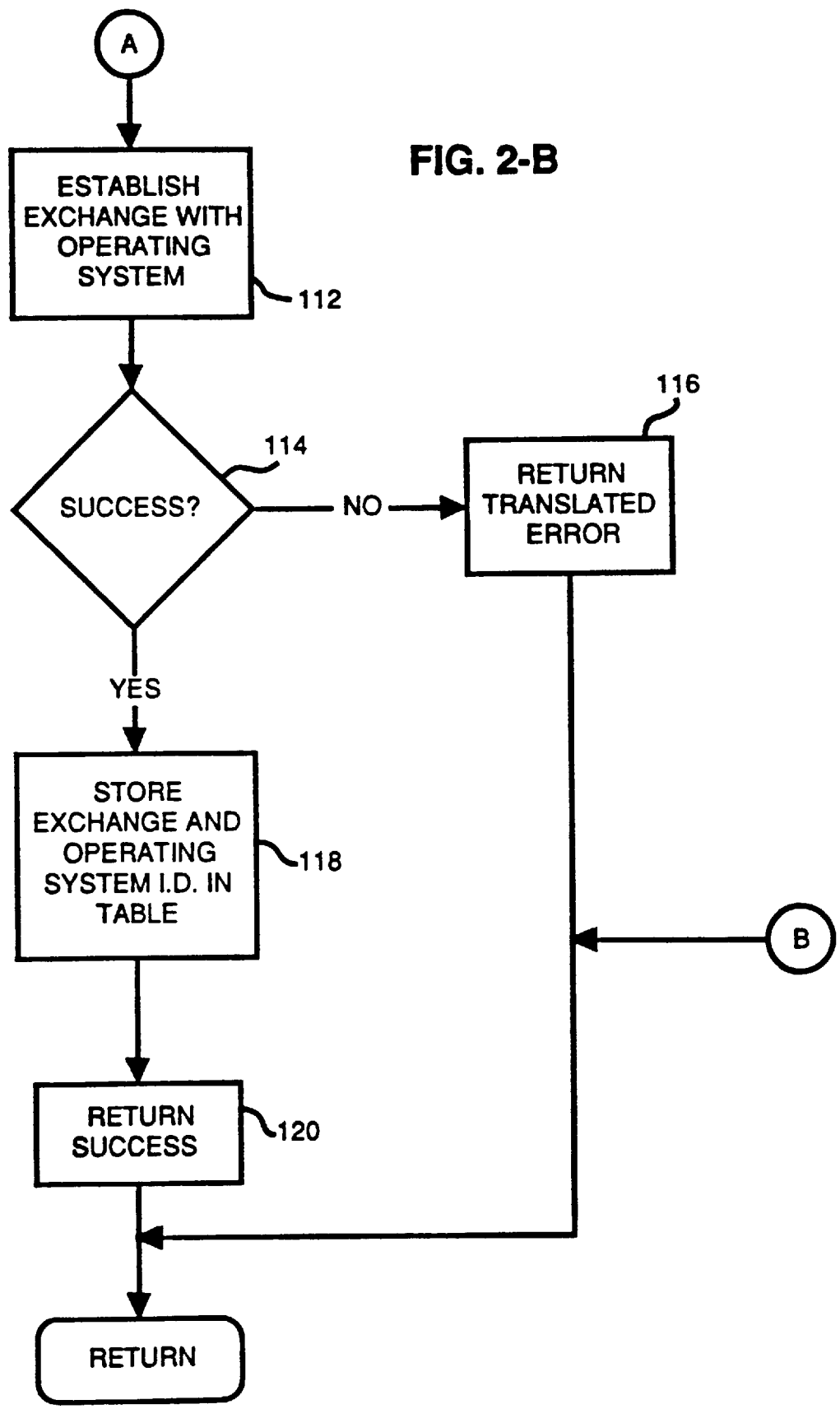

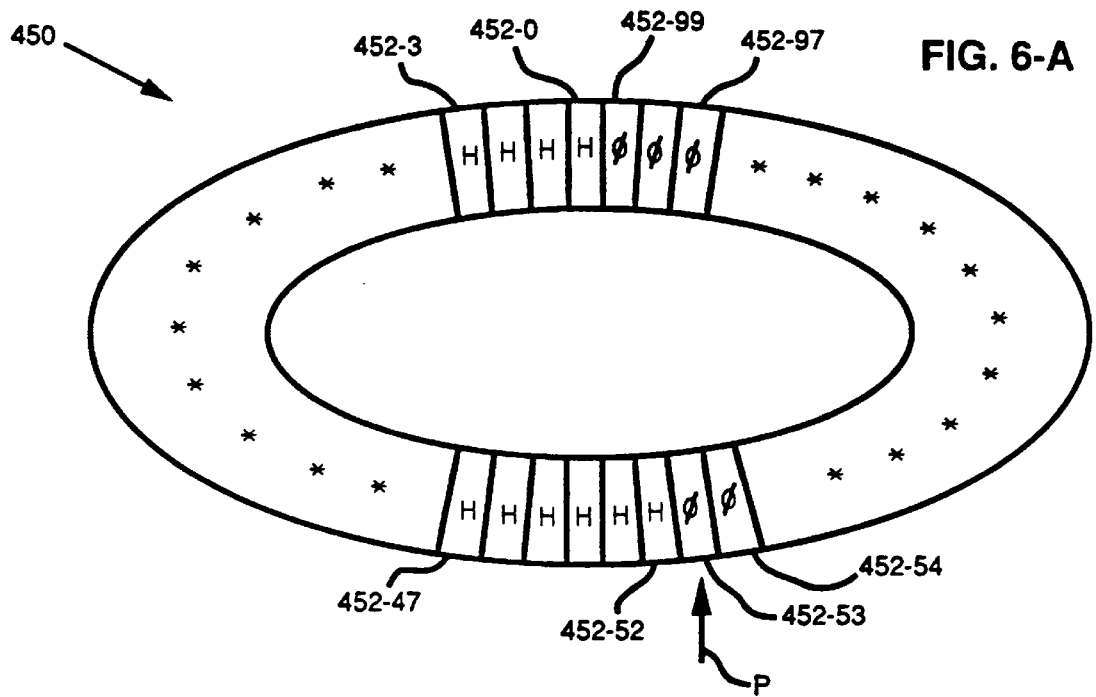
FIG. 6-A
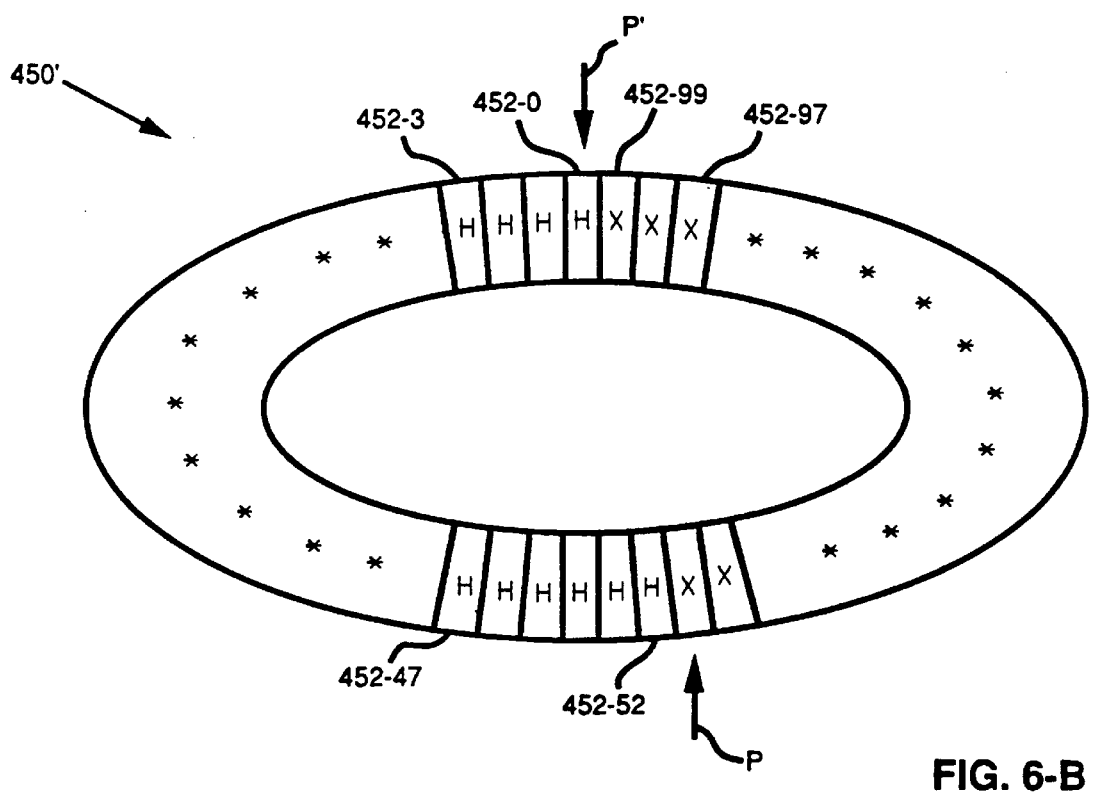
FIG. 6-B

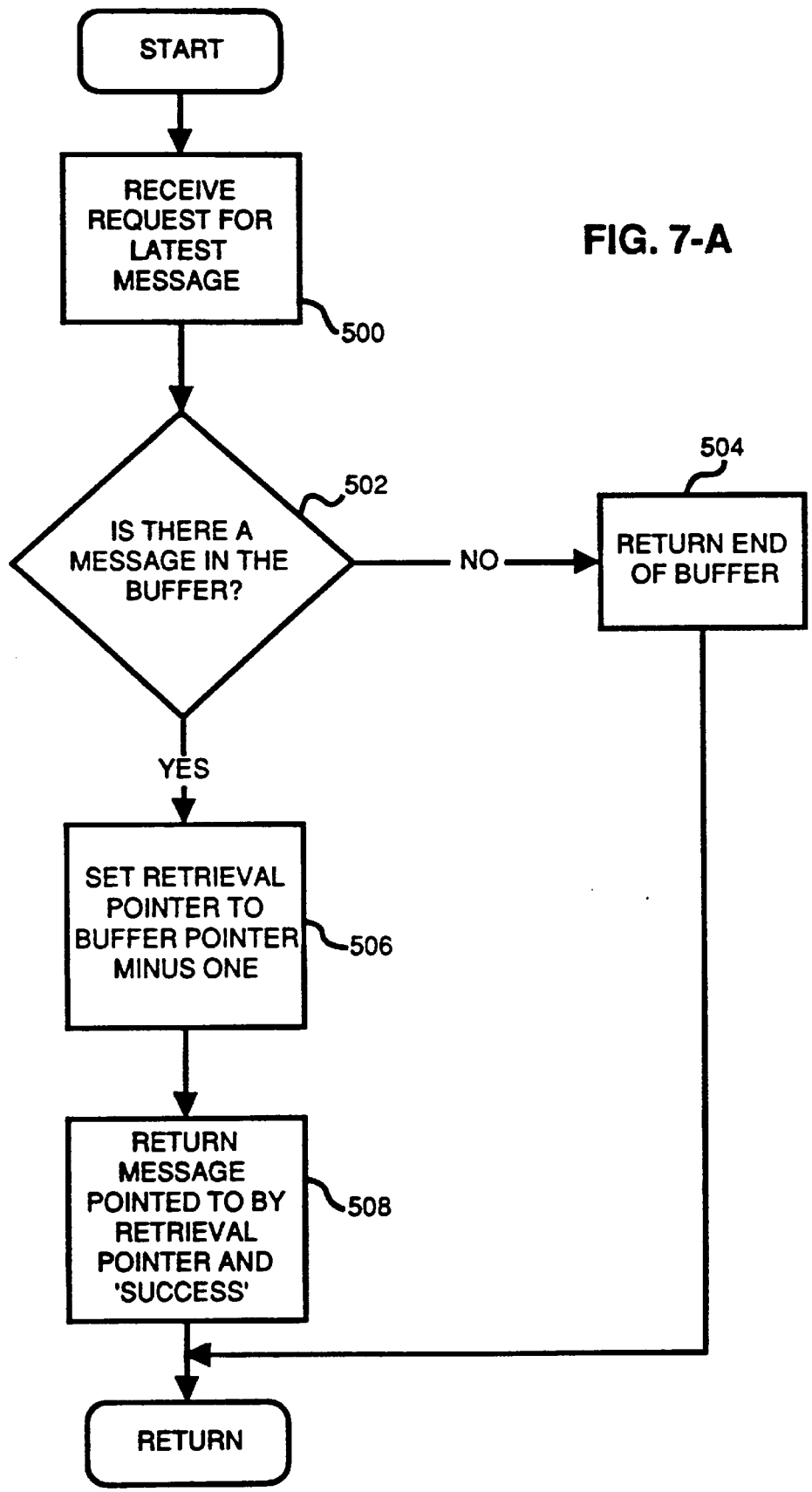
FIG. 7-A

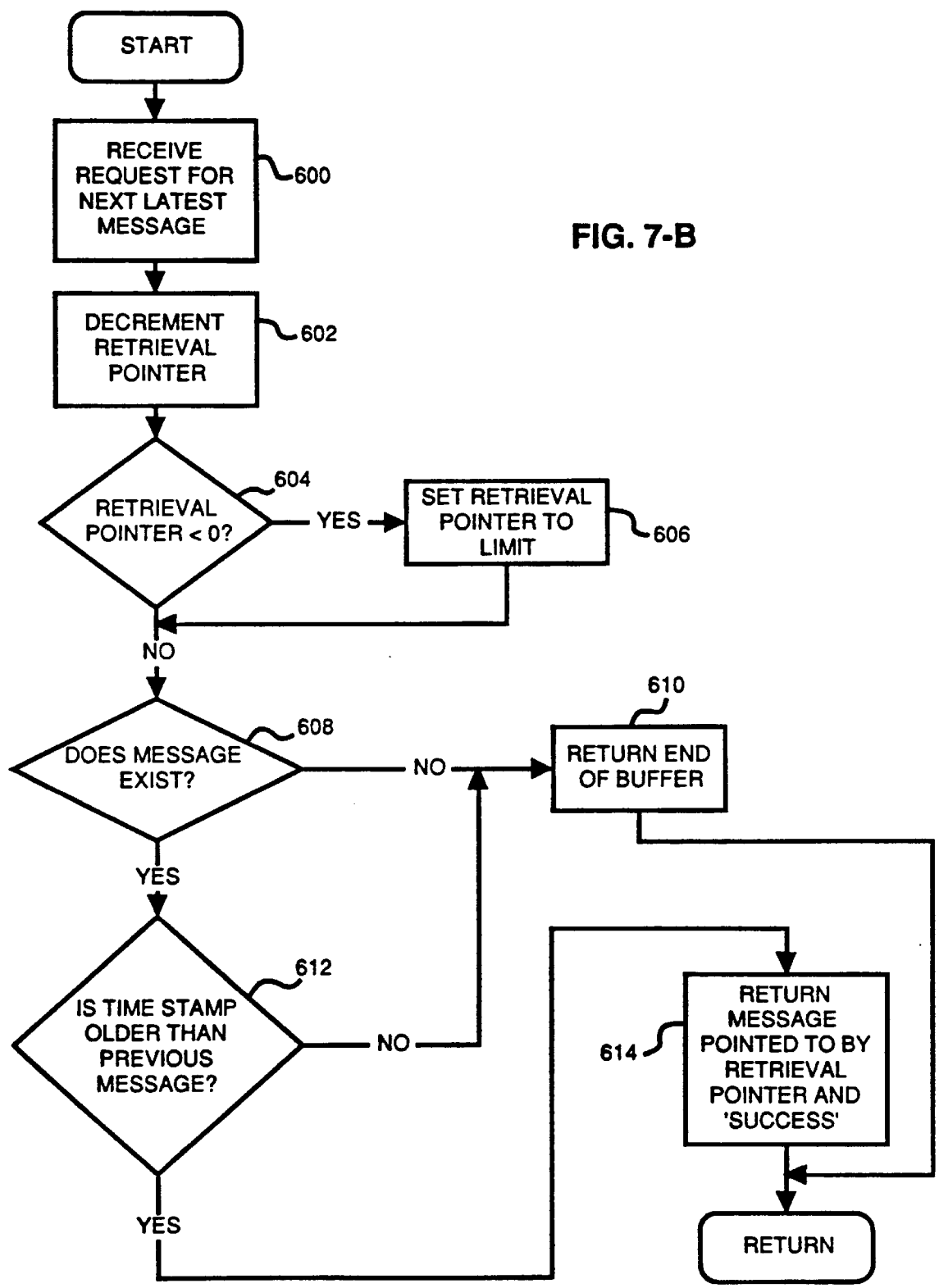
FIG. 7-B

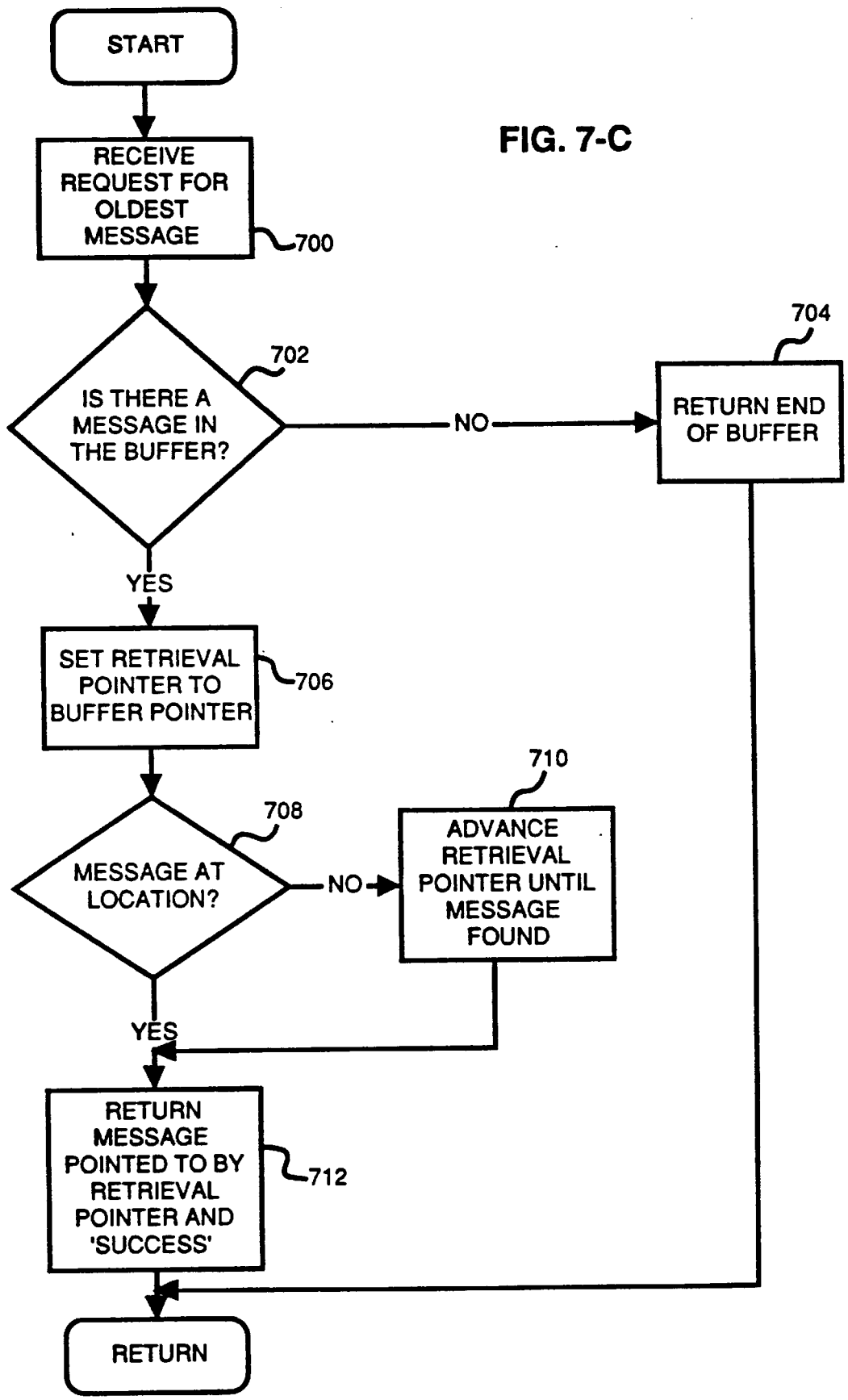
FIG. 7-C

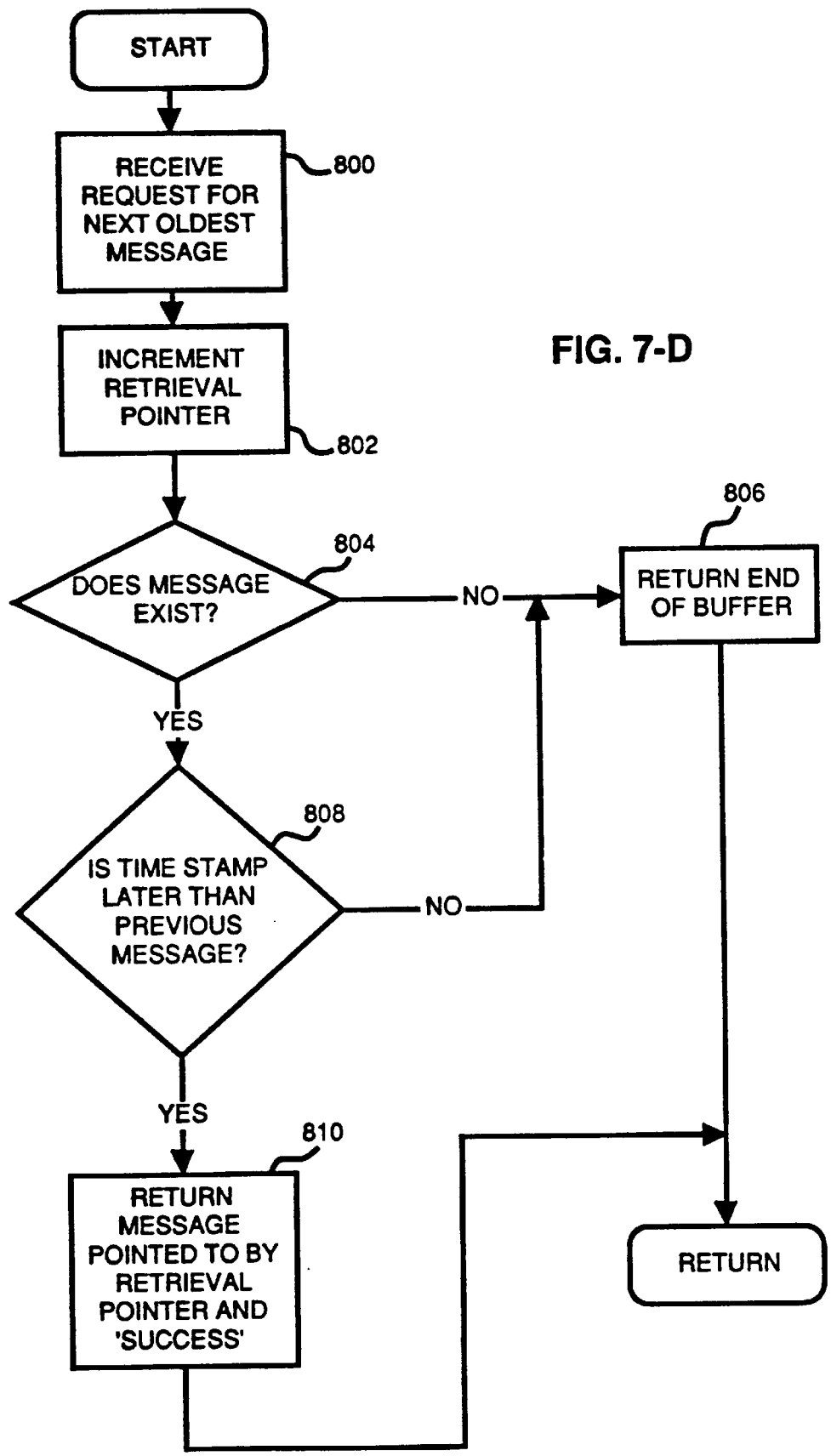

METHOD OF TRANSMITTING MESSAGES BETWEEN SOFTWARE PROCESSES IN A MULTITASKING DATA PROCESSING SYSTEM

FIELD OF THE INVENTION

This invention relates to data processing systems and in particular to such systems in which there are a number of software functions that operate with messaging between functions.

BACKGROUND OF THE INVENTION

With the continuing advances in microprocessors and other computer hardware it is increasingly common to design data processing systems in the form of multitasking systems comprising several, quasi-independent processes that operate simultaneously or as if simultaneously via time division. Interaction among such processes is frequently accomplished by passing 'messages' between the processes, and facilities for messaging are often included in operating system software. Examples of such operating systems are the "psos" operating system published by Software Components Group, Inc., Santa Clara, Calif., and the "RMX" operating system published by Intel Corporation, Santa Clara Calif.

Thus an application program comprising several functions may be written to run under an operating system that provides messaging between the-processes. However, it frequently becomes necessary to run the application program, or some of the processes, under an operating system other than the operating system for which the application program was first written. For example, sometimes a desire to change the hardware for the data processing system requires that a new operating system be used. In these cases, the application program must be "ported" to the new operating system, and adapted to use the new operating systems messaging facilities. This may require considerable modifications to the application program, with attendant costs, delays and so forth.

It is therefore to be desired that messaging between the processes be carried out in such a way that the application program may be readily adapted to operate with different operating systems. It is also desirable to design a messaging method that facilitates program debugging.

SUMMARY OF THE INVENTION

According to the invention, in a data processing system that includes operating system software with a messaging capability, a method of transmitting a message between software processes includes the following steps:

(a) receiving a message transmittal request from a sending process, the request specifying a recipient process;

(b) generating a header for the message in accordance with the operating system's requirements;

(c) determining an exchange address for the recipient process; and (d) transmitting the message to the recipient's exchange address by means of the operating system.

According to one aspect of the invention, the header includes data indicating the time at which the request was received and the header is stored in a circular buffer log so as to facilitate debugging.

BRIEF DESCRIPTION OF THE DRAWINGS

FIGS. 2-A and 2-B are a flow chart that illustrates a routine for establishing a facility to send messages to and receive messages from a software process.

FIGS. 6A and 6-B are schematic illustrations of alternative embodiments of a circular buffer used to log messages received by the clearing house.

FIG. 7-A, 7-B, 7-C and 7-D are flow charts that illustrate routines for retrieving messages from the message logging buffer.

DETAILED DESCRIPTION OF THE INVENTION

Figure 1:
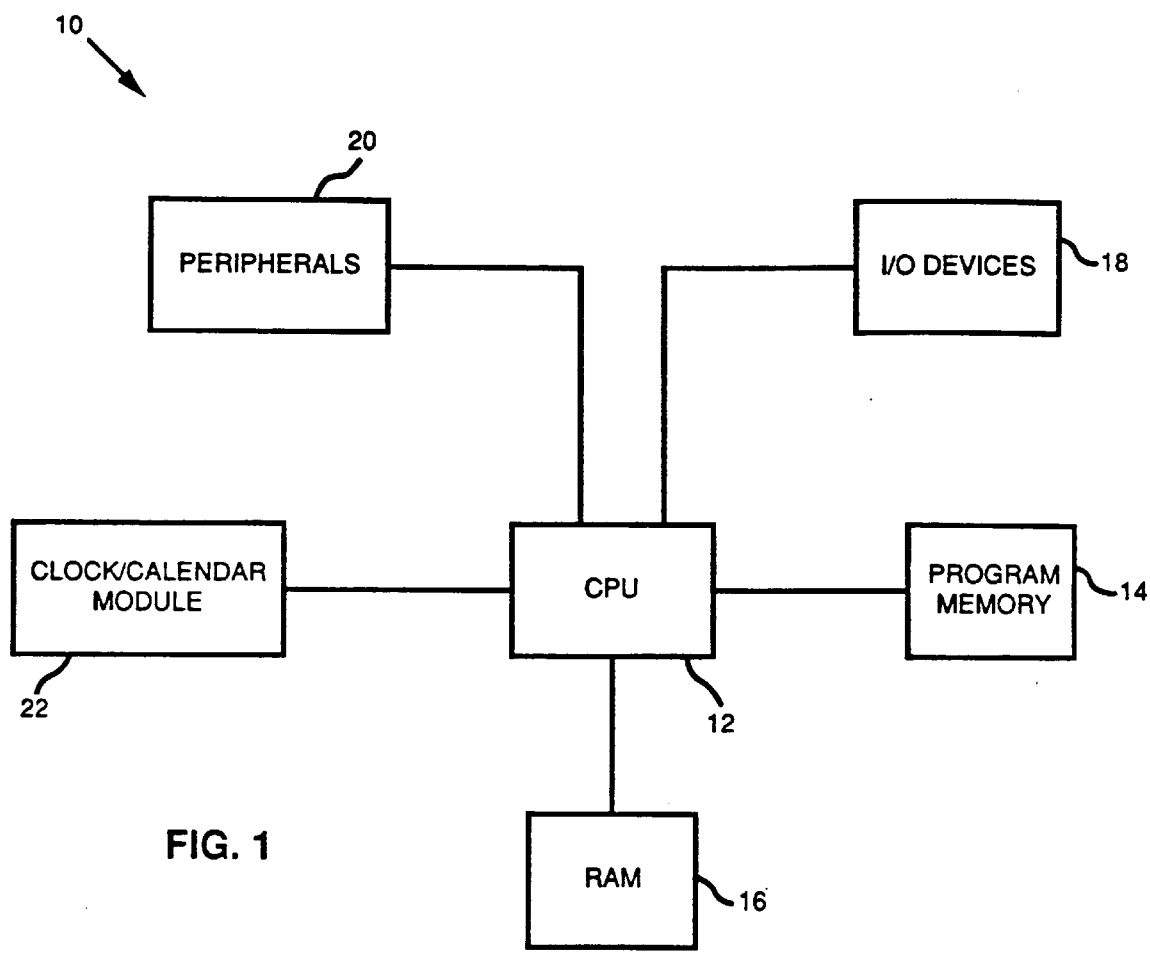
FIG. 1 is a block diagram of a data processing device in which the inventive method may be used.

A data processing system in which the inventive method may be used is shown in block diagram form on FIG. 1. Reference numeral 10 generally refers to the data processing system. System 10 includes CPU 12, which may be a conventional microprocessor. Program memory 14 is operatively connected to CPU 12 and stores the operating system software and the application program that control system 10.

RAM 16 is also operatively connected to CPU 12 and is used for scratch pad operations, data storage, stack operations and so forth. It will be appreciated that program memory 14 and RAM 16 may be combined in some cases, as, for example, when RAM 16 is battery-backed-up.

System 10 also includes one or more I/O devices 18 and one or more peripheral devices 20, all connected to and controlled by CPU 12. The I/O devices may include a keyboard, a display and a printer. Peripherals 20 may include a variety of devices. For example, if system 10 takes the form of a carrier management system, peripherals 20 may include an electronic weighing scale and a postage meter.

System 10 also includes clock/calendar module 22 which is connected to CPU 12 and provides a signal indicating the current date and time.

It should be understood that the hardware making up system 10 may take a wide variety of forms. Specific examples include the carrier management systems disclosed in U.S. Pat. Nos. 5,009,276 and 5,024,282 and in copending patent applications Ser. Nos. 07/760,639 and 07/760,638, now U.S. Pat. No. 5,357,629, all of which are assigned to the assignee of this application.

As previously indicated, an operating system and an application program are stored in program memory 14 and control the operation of system 10. The operating system may be one of the above mentioned "psos" or "RMX" systems or another operating system that supports multitasking and messaging among software processes. The application program includes a number of software processes; for example, if system 10 is a carrier management system, the processes may include a 'weight daemon' that manages and receives data from a scale, a transaction manager that handles parcel shipping transactions, and a database manager that stores accounting and other information.

As will be appreciated by those skilled in the art, the operating system includes utilities for passing messages from one software process to another. For the purpose of receiving messages, each process is known to the operating system by a unique process identification code.

According to the invention, a software process that will be referred to as the "clearing house" manages the access of the other processes to the operating system's messaging capability. When each process is initialized, it sends a request to the clearing house to establish access to messaging. FIGS. 2-A and 2-B are a flow chart of the routine by which the clearing house handles the request. The routine begins with step 100, at which the clearing house receives the process's request to establish a facility for sending and receiving messages. This facility will be referred to as an "exchange". Following step 100 is step 102, at which the clearing house checks an exchange table to determine if the requested exchange has already been established. It should be noted that the exchange table contains all existing exchanges.

Step 104 follows step 102. If the requested exchange already exists, the routine branches at step 104 to return to the requesting process an error message to that effect (step 106) and the routine then ends. If at step 104 the requested exchange is not found to exist, the routine proceeds to step 108, at which it is determined whether the exchange table has room for another exchange. If not, an "out of room" error message is returned to the requesting process (step 110) and the routine ends. If at step 108 the exchange table was found to have room, the routine proceeds to step 112 at which the clearing house requests a messaging facility from the operating system. Next, at step 114, it is determined whether the request to the operating system was successful. If not, the routine proceeds to step 116, at which it translates the error message from the operating system into a form that will be meaningful to the requesting process and sends the translated error message to the requesting process.

If at step 114 the request to the operating system was successful, the routine proceeds to step 118. At step 118, the clearinghouse stores in the exchange table the identification code returned by the operating system and also an exchange code that indicates that the facility just obtained belongs to the requesting process. The clearing house then sends to the requesting process a code indicating that the exchange has been established (step 120) and the routine ends.

In a preferred mode of carrying out the invention, a process may request more than one exchange. Each requested exchange is included in the exchange table with a corresponding, unique facility identification code received from the operating system.

Figure 3:
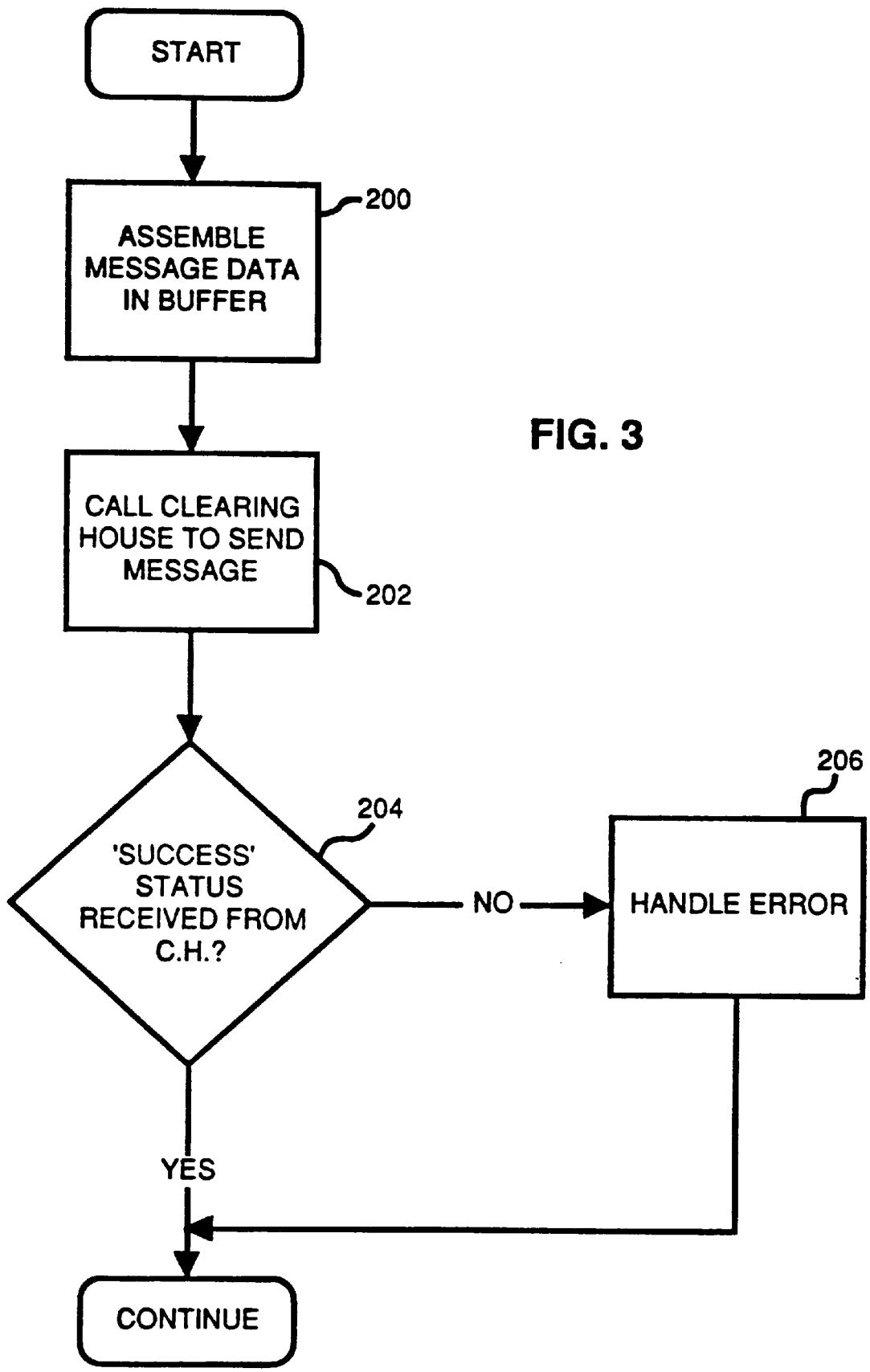
FIG. 3 is a flow chart that illustrates a routine whereby a software process sends a message to a software message clearing house.

FIG. 3 illustrates a routine by which a process sends a message to another process via the clearing house. The routine begins with step 200, at which the sending process (sometimes referred to as the "sender"), assembles in a buffer the data that is to make up the message. Step 202 follows, at which the sender sends the message via the clearing house. The message is sent by a function call that initiates a message transmission routine of the clearing house. The function call passes a number of parameters concerning the message, which parameters preferably include sending process ("sender"), receiving process ("recipient"), message type, pointer to the buffer holding the message data, broadcast flag, response flag. The response flag indicates whether the message is in response to a message sent by the recipient. The broadcast flag indicates whether the message is to be sent to every exchange. The purpose of the message type is to inform the recipient how to handle the message; the message type thus represents the type of service requested.

After step 202 is step 204, at which it is determined whether the clearinghouse has indicated that the message was successfully sent. If not, the sending process takes appropriate steps to handle the error (step 206), which may include resending the message. Otherwise, the routine ends.

Figure 4:
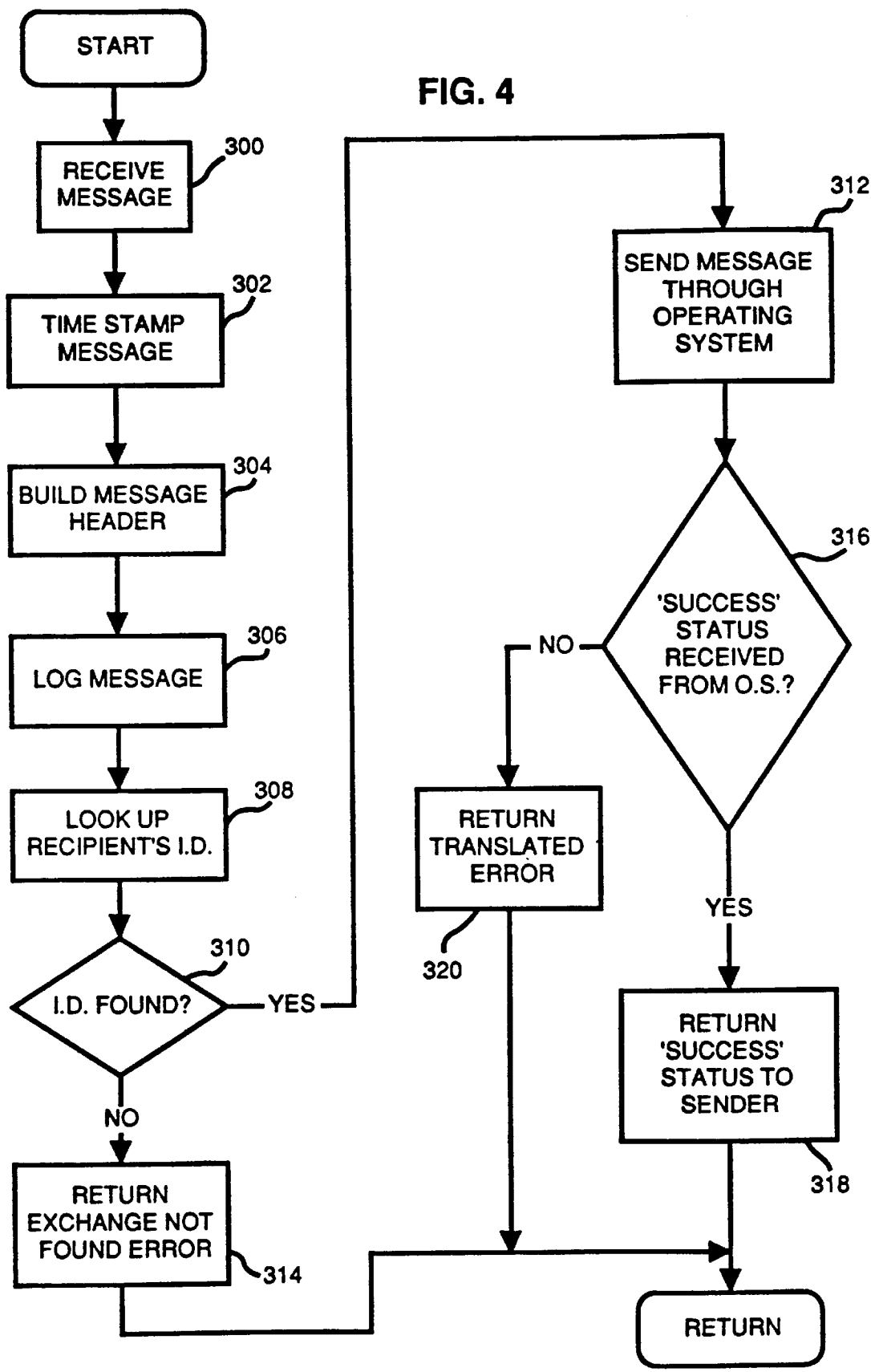
FIG. 4 is a flow chart that illustrates a routine whereby a software message clearing house receives and transmits a message.

FIG. 4 illustrates a routine whereby the clearing house receives a message from a sending process and transmits the message via the operating system's messaging utilities. The routine begins with step 300, at which a message is received from a sending process. Next is step 302, at which the clearing house "time stamps" the message. That is, the clearing house associates with the message the date and time at which the message was received, utilizing a signal from clock/calendar module 22.

Following step 302 is step 304, at which the clearing house builds a message header, which consists of the above-mentioned message parameters passed by the sender with the addition of the time stamp information. The header is assembled in such a way that it will meet the requirements of the operating system.

Step 306 follows step 304. At step 306 the clearing house logs the message by placing it in a circular buffer. The purpose and nature of the buffer will be discussed in more detail below.

After step 306 is step 308, at which the clearing house refers to the exchange table to determine whether an exchange has been established for the recipient. If a matching exchange code is found (step 310), the clearing house uses the corresponding identification code issued by the operating system to send the message to the recipient via the operating system's messaging procedure (step 312). Thus the corresponding identification code serves as the recipient's exchange address. If an exchange code was not found at step 310, the clearing house returns to the sender an error code indicating that the exchange was not found (step 314) and the routine ends.

Following step 312, the clearing house determines, at step 316, whether the operating system returns a status code of success concerning the operating system message transmitted at step 312. If so, the clearing house returns to the sender a status code indicating success in transmitting the message (step 318) and the routine ends. If not, the clearing house translates the error message from the operating system into a form that will be meaningful to the sending process and sends the translated error to the requesting process (step 320) and the routine ends.

Figure 5:
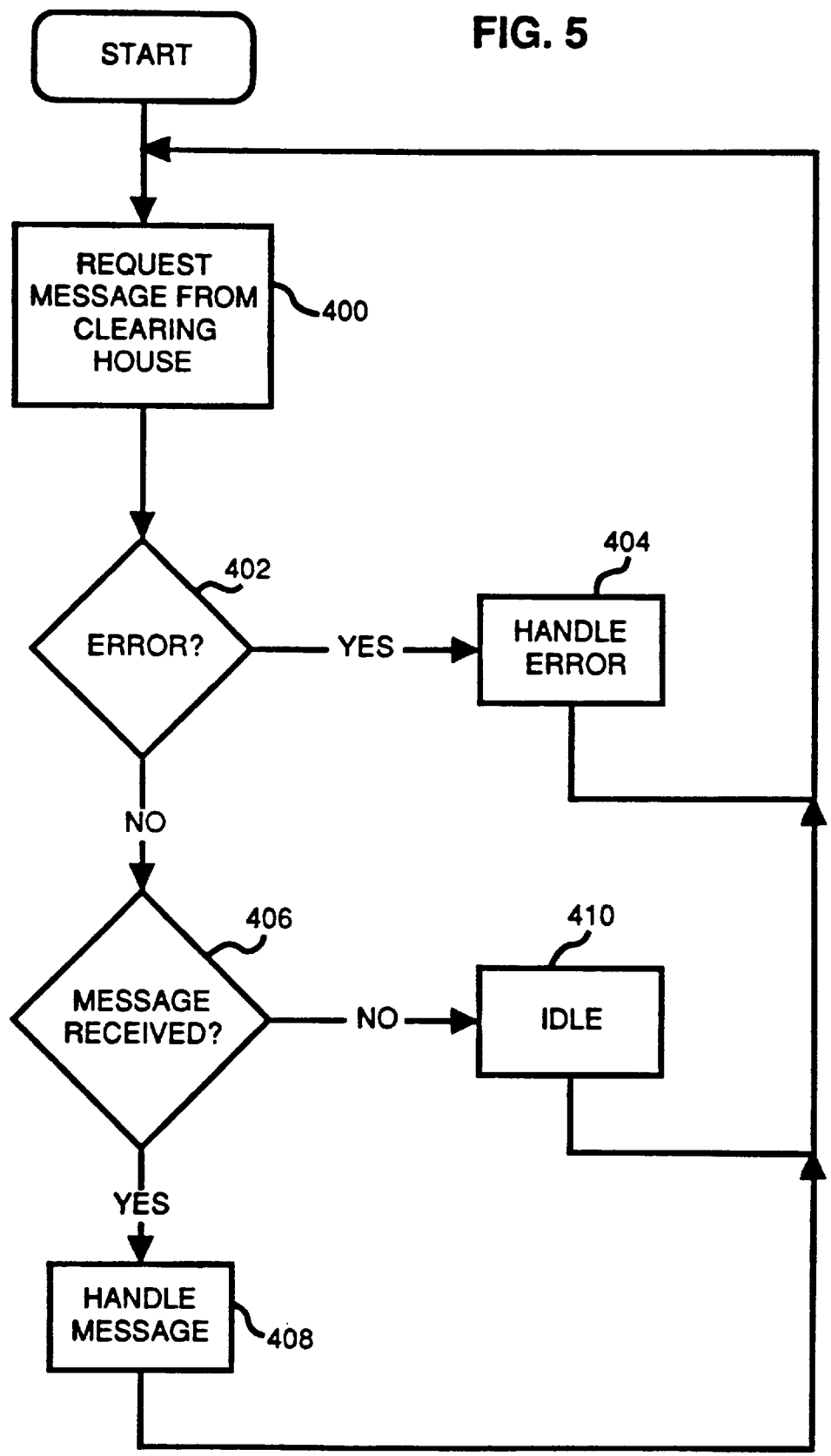
FIG. 5 is a flow chart that illustrates a routine whereby a software process receives a message from a software clearing house.

FIG. 5 illustrates a routine by-which a process receives a message. At a time when the process is able to handle a message, the process sends to the clearing house a request for a message (step 400). In a preferred approach to carrying out the invention, the request specifies one of three modes of response from the clearing house if no message is waiting for the process. The first mode is an immediate response by the clearing house that no message is waiting. The second mode is a response after a delay period if no message is received for the process by the end of the delay period. In the third mode, the clearing house does not respond until a message for the process is received. It will be noted that the first mode is equivalent to the second mode with a delay period equal to zero, while the third mode is equivalent to the second mode with an infinite delay period.

If a response is provided by the clearing house, the response will consist of one of the following: (1) an error code, (2) a message that has been received for the process or (3) a code indicating that no message has been received for the process. At step 402, it is determined whether an error code was returned by the clearing house. If so, the process handles the error (step 404) and the routine loops back to step 400. If not, it is determined whether a message has been received from the clearing house (step 406). If a message is received, the process handles the message (step 408). For example, if the message is a request for service from another process, the recipient process provides the requested service. As another example, if the message is in response to the process's own request for service, the process takes the action that is appropriate to the response. After step 408 the routine loops back to step 400.

If at step 406 no message is received, the routine branches to step 410, at which it idles until it is again appropriate to request a message (step 400).

In the routines described above, it will be observed that there is no direct contact between the operating system and the sending or receiving processes. Messages to be sent by a process are sent to the clearing house. Messages to be received by a process are received from the clearing house. Exchange facilities are set up through the clearing house. In a preferred approach to the invention only a few very time-sensitive messages are transmitted by processes by direct use of the operating system. All others pass through the clearing house in accordance with the routines disclosed herein. Messaging within the application program is largely insulated from the particular characteristics of the operating system. If it is desired to change operating systems, some revision to the clearing house will be required, but few if any changes will be necessary in the processes that make up the bulk of the application program. Porting the application program to another operating system is therefore greatly facilitated.

As noted above, a process may have more than one exchange. An example of this situation would be a process that mainly utilizes one exchange for sending messages, but has a second exchange available for particularly urgent messages. When the clearing house receives a message from a process having more than one exchange, any response to that message is returned to the same exchange used to send the message.

It was also noted above that certain messages are to be broadcast. That is, such messages are to be relayed by the clearing house to every exchange. The clearing house therefore sends the original message to one recipient and sends a copy of the message to each other recipient.

In connection with step 306 (FIG. 4), reference was made to a circular buffer in which message headers were stored by the clearing house. The nature and use of the buffer will now be discussed with reference to FIGS. 6-A, 6-B, 7 and 8.

Reference numeral 450 (FIG. 6A) refers generally to a circular buffer having a plurality of storage locations 452-0, 452-1, etc. In a preferred embodiment buffer 450 has 100 storage locations. When buffer 450 is initialized, a null value is stored in each location. Thereafter, each time the clearing house receives a message, the message header is stored in the next storage location 452 has been assumed for the purposes of FIG. 6-A that the first header was stored in location 452-0, the next in 452-1, and so forth through location 452-52, which stores the header for the most recent message. Locations 452-53 through 452-99 still hold null values. (It will be appreciated that locations 452-4 through 452-46 are not explicitly shown, but rather are indicated by asterisks. Such also is the case for locations 452-55 through 452-96.) A buffer pointer, represented by arrow P, points to the location 452-53, the location in which the next message header is to be stored. The buffer pointer is then incremented each time a header is stored in buffer 450. As will be understood by those skilled in the art, the 101st header will be stored in location 452-0, displacing the header currently stored in that location. The same process will continue indefinitely, maintaining the latest 100 message headers in the buffer.

Buffer 450 is useful in program debugging. Upon experiencing a software error, the programmer is able to request the system to output a number of the latest or the oldest stored message headers. The sequence of headers thereby obtained may aid in determining what caused the error.

FIG. 7 A is a flow chart of a routine for retrieving the most recently logged message header from buffer 450. The routine begins with receipt of a request for the latest message (step 500). It is next determined whether there are any messages in the buffer (step 502). If not, an "end of buffer" message is returned (step 504) and the routine ends. Otherwise, step 506 follows, at which a retrieval pointer is set equal to the value of the buffer pointer minus one. (It will be recalled that the buffer pointer points to the next location in which a header is to be stored). Following step 506 is step 508, at which the routine returns the message header stored at the location pointed to by the retrieval pointer and a status code indicating that the request was successfully handled. The routine then ends.

FIG. 7-B is a flow chart for retrieving the message header immediately preceding the header just retrieved. The routine begins with receipt of a request for the next latest message (step 600). The retrieval pointer is then decremented (step 602). It is then determined whether the retrieval pointer is negative (step 604). If so, the retrieval pointer is set to point to the last location in the buffer, i.e. location 452-99 (step 606).

Step 608 either follows step 606, or immediately follows step 604 if the retrieval pointer was not found to be negative. It is determined at step 608 whether a message is stored in the location pointed to by the retrieval pointer. If not, an "end of buffer" message is returned (step 610) and the routine ends. Otherwise, it is determined whether the time stamp of the message at that location is older than the time stamp of the message just retrieved (step 612). If not, again step 610 follows and the routine ends. If so, step 614 follows, at which the routine returns the message header stored at the location pointed to by the retrieval pointer and a status code indicating that the request was successfully handled. The routine then ends.

It will be appreciated that the routine of FIG. 7-B may be invoked by successive requests until an "end of buffer" message is returned. It should also be noted that FIG. 7-B may not be successfully invoked unless if the routine of FIG. 7-A has previously been successfully completed. Otherwise, the retrieval pointer will not have been properly set, so that step 602 will not produce a meaningful retrieval pointer value.

FIG. 7-C is a flow chart of a routine for retrieving the oldest message header stored in buffer 450. The routine begins with receipt of a request for the oldest message (step 700). It is next determined whether there are any messages in the buffer (step 702). If not, an "end of buffer" message is returned (step 704) and the routine ends. Otherwise, step 706 follows at which the retrievel pointer is set equal to the buffer pointer. It must then be determined whether a message is stored at the location pointed to by the retrieval pointer (step 708). If not (i.e., if a null value is found in the location), the retrieval pointer is advanced until a message is present, i.e. to location 452-0.

Step 712 then follows step 710; alternatively, step 712 immediately follows step 708 if a message was found to be present at that step. In either case, at step 712 the routine returns the message header pointed to by the retrieval pointer and a status code indicating that the request was handled successfully. The routine then ends.

FIG. 7-D is a flow chart for retrieving the message header stored immediately after the header just retrieved. The routine begins with receipt of a request for the next oldest message (step 800). The retrieval pointer is then incremented (step 802). It is then determined whether a message is stored in the location pointed to by the retrieval pointer (step 804). If not, an "end of buffer" message is returned (step 806) and the routine ends. Otherwise, it is determined whether the time stamp of the message at that location is later than the time stamp of the message just received (step 808). If not, again step 806 follows and the routine ends. If so, step 810 follows, at which the routine returns the message header stored at the location pointed to by the retrieval pointer and a status code indicting that the request was successfully handled. The routine then ends.

As was the case with the routine of FIG. 7-B, the routine of FIG. 7-D may be invoked by successive requests until an "end of buffer" message is returned. Also, FIG. 7-D may be successfully invoked only if the routine of FIG. 7-C has previously been completed. Otherwise, the retrieval pointer will not have been properly set, so that step 802 will not produce a meaningful retrieval pointer value.

FIG. 6-B schematically shows an alternative embodiment of the message header buffer, generally indicated by reference numeral 450'. Buffer 450' is similar to buffer 450, except that null values are not stored in locations 452 upon initialization. Therefore, until headers are stored therein, locations 452 hold random data or obsolete message headers, indicated by an "X" in FIG. 6-B. In addition to buffer pointer P, which points to the location in which the next message header is to be stored, buffer 450' also uses an oldest header pointer, represented by arrow P', which points to the location of the oldest message header stored in buffer 450'. It will be appreciated that upon the storage of the 100th header pointers P and P' will be pointing to the same location, namely 452-0. Thenceforward both pointers will be incremented each time a header is stored, so that both pointers will advance together from one location 452 to the next.

It will also be appreciated that the routines of FIGS. 7-A, 7-B, 7-C and 7-D will be modified in a few respects if buffer 450' is used. For example, the position of the oldest header pointer will be used to make the determinations of step 608 (FIG. 7-B) and step 804 (FIG. 7-D).

It should be noted that logging message headers in a buffer, although advantageous, is not essential to the method of messaging disclosed herein.

While the invention has been disclosed and described with reference to a limited number of approaches and embodiments it is apparent that variations and modifications may be made therein and it is therefore intended in the following claims to cover each such variation and modification as falls within the true spirit and scope of the invention what

What is claimed is:

1. A method of transmitting a message between software processes in a multitasking data processing system, said system having operating system software selected from a plurality of operating systems with a messaging capability, and a clearing house process for providing a common interface to said processes independently of said selected operating system software, the method comprising the steps of:

(a) said clearing house process receiving a message transmittal request from a sending process, said request specifying a recipient process; and;

(b) providing an identifying message header for identifying said sending process and said recipient process with respect to a particular message to said operating system software by generating said header for said message in accordance with said request and with requirements of said operating system software; then;

(c) storing said generated header in a buffer to establish a record of messages transmitted between said processes;

(d) determining, through said clearing house process, an exchange address for said recipient process; and, (e) transmitting said message to said recipient's exchange address by means of said operating system software.

2. The method of claim 1, further comprising the steps of:

associating a time signal with said received request, said signal indicating a time at which said request was received; and including in said header data representative of said signal.

3. The method of claim 2, further comprising the step of storing said generated header in a buffer, said buffer comprising a plurality of storage locations, each location containing a message header.

4. The method of claim 1, further comprising the step of storing said generated header in a buffer, said buffer comprising a plurality of storage locations, each location containing a message header.

5. The method of claim 4, wherein said buffer is a circular buffer.

6. A computer-implemented method of debugging a software program, said program comprising a plurality of processes, the method comprising the steps of:

(a) transmitting messages among said processes via a clearing house process;

(b) storing data, in the form of a message header concerning said transmitted messages, in a buffer;

(c) retrieving said stored data from said buffer; and, (d) analyzing said retrieved stored data for sequence breaks and header errors.

7. The method of claim 6, further comprising the steps of:

associating a time signal with said message, said signal indicating a time at which said message was received for transmission; and including in said data information representative of said signal.

8. The method of claim 7, wherein said buffer is a circular buffer.

9. A method of transmitting a message between software processes in a multitasking data processing system, said system having operating system software with a messaging capability, the method comprising the steps of:

(a) establishing a clearing house process for providing a common interface to said software processes;

(b) assembling an exchange table; said exchange table containing all existing exchanges for sending and receiving messages at which said clearing house process will check to determine if a requested exchange and a corresponding identification code have already been established; and, said table comprising a plurality of first entries and a plurality of second entries, each of said first entries identifying one of said processes, each of said second entries corresponding to one of said first entries and consisting of an operating system exchange code, said exchange code being a clearing house process generated code that indicates that an exchange has been established;

(c) receiving a message transmittal request from a sending process, said request specifying a recipient process;

(d) generating a header for said message in accordance with requirements of said operating system software;

(e) determining an exchange address for said recipient process by reference to said assembled exchange table; said exchange address being indicative of a correspondence of identification codes obtained when a sending process has requested a message header that has been issued an identification code by the operating system that matches an identification code stored at said clearing house process and generated when the receiver's receiving ability was established; and (f) transmitting said message to said recipient's exchange address by means of said operating system software.

10. The method of claim 9, further comprising the steps of:

associating a time signal with said received request, said signal indicating a time at which said request was received; and including in said header data representative of said signal.

11. The method of claim 10, further comprising the step of storing said generated header in a buffer, said buffer comprising a plurality of storage locations, each location containing a message header.

12. The method of claim 11, wherein said buffer is a circular buffer.

\* \* \* \* \*